(12) United States Patent
Kim et al.

(10) Patent No.: US 12,735,122 B2
(45) Date of Patent: Sep. 15, 2026

(54) AIR CURTAIN APPARATUS AND VEHICLE BUMPER ASSEMBLY INCLUDING THE SAME

(71) Applicant: HYUNDAI MOBIS CO., LTD., Seoul (KR)

(72) Inventors: Jang Ho Kim, Yongin-si (KR); Jae Sup Byun, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 342 days.

(21) Appl. No.: 18/390,565

(22) Filed: Dec. 20, 2023

(65) Prior Publication Data

US 2025/0100632 A1 Mar. 27, 2025

(30) Foreign Application Priority Data

Sep. 25, 2023 (KR) ........................ 10-2023-0128090

(51) Int. Cl.
*B62D 35/00* (2006.01)
*B60R 19/48* (2006.01)

(52) U.S. Cl.
CPC ........... *B62D 35/005* (2013.01); *B62D 35/00* (2013.01); *B60R 2019/486* (2013.01)

(58) Field of Classification Search
CPC .... B62D 35/00; B62D 37/052; B62D 35/005; B60R 2019/486
See application file for complete search history.

(56) References Cited

U.S. PATENT DOCUMENTS 4,457,558 A 7/1984 Ishikawa
9,669,885 B1 * 6/2017 Fahland ................. B62D 37/02
9,855,981 B1 * 1/2018 Dunford ................ B62D 35/00
10,336,181 B2 * 7/2019 Kubo ................... B60K 11/085
11,370,295 B2 * 6/2022 Schneider ............. B60K 11/04
(Continued)

FOREIGN PATENT DOCUMENTS

DE 102014111073 A1 * 2/2016 ........... B62D 35/005
DE 102014118800 A1 * 6/2016 ............. B62D 35/00
(Continued)

OTHER PUBLICATIONS

Extended European Search Report issued in corresponding European Patent Application EP 23216494.7 dated Jun. 11, 2024.
(Continued)

*Primary Examiner* — Jason S Morrow
(74) *Attorney, Agent, or Firm* — MORGAN, LEWIS & BOCKIUS LLP

(57) ABSTRACT

The present invention relates to an air curtain apparatus capable of improving aerodynamics of a vehicle and preventing the degradation of aesthetics of the vehicle, and a vehicle bumper assembly including the same. In an air curtain apparatus disposed in a bumper cover provided with an inlet hole through which headwind is introduced according to one embodiment of the present invention, the air curtain apparatus includes a flap assembly disposed in the inlet hole to open and close the inlet hole and an actuator coupled to the flap assembly to operate the flap assembly, wherein the flap assembly includes a plurality of flaps disposed collinear with the bumper cover to close the inlet hole and rotated in a stepped manner to open the inlet hole.

14 Claims, 8 Drawing Sheets

(56) References Cited

U.S. PATENT DOCUMENTS

| | | | | |
|---|---|---|---|---|
| 11,376,945 | B2 * | 7/2022 | Harter | B60K 11/085 |
| 11,560,048 | B2 * | 1/2023 | Kim | F01P 7/10 |
| 11,639,099 | B2 * | 5/2023 | Byun | F01P 7/10<br>180/68.1 |
| 11,891,125 | B2 * | 2/2024 | Byun | B60K 11/085 |
| 11,993,203 | B1 * | 5/2024 | Kim | F21S 41/39 |
| 2016/0089971 | A1 * | 3/2016 | Asai | B62D 25/085<br>296/193.1 |
| 2017/0291485 | A1 * | 10/2017 | Yasui | B60K 11/085 |
| 2018/0347449 | A1 * | 12/2018 | Clapie | F01P 11/10 |
| 2019/0160939 | A1 | 5/2019 | Kubo et al. | |
| 2024/0131922 | A1 * | 4/2024 | Yoon | F01P 7/10 |

FOREIGN PATENT DOCUMENTS

| | | | | | |
|---|---|---|---|---|---|
| DE | 102020103137 | A1 | * | 8/2021 | B62D 35/005 |
| FR | 2858796 | A1 | * | 2/2005 | B62D 35/005 |
| JP | 2005-041387 | | | 2/2017 | |
| JP | 2022-113314 | A | | 8/2022 | |
| KR | 20210033181 | A | * | 3/2021 | B60K 11/085 |

OTHER PUBLICATIONS

Office Action dated Feb. 26, 2025, issued in corresponding Korean Patent Application No. 10-2023-0128090.

* cited by examiner

[FIG. 1]
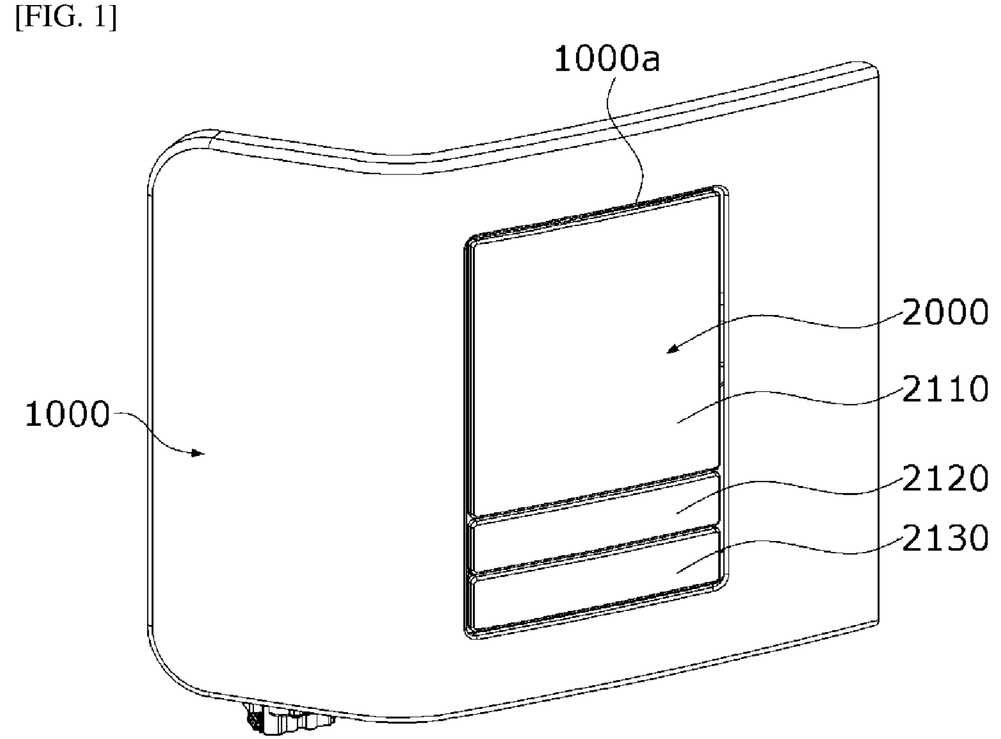

[FIG. 2]
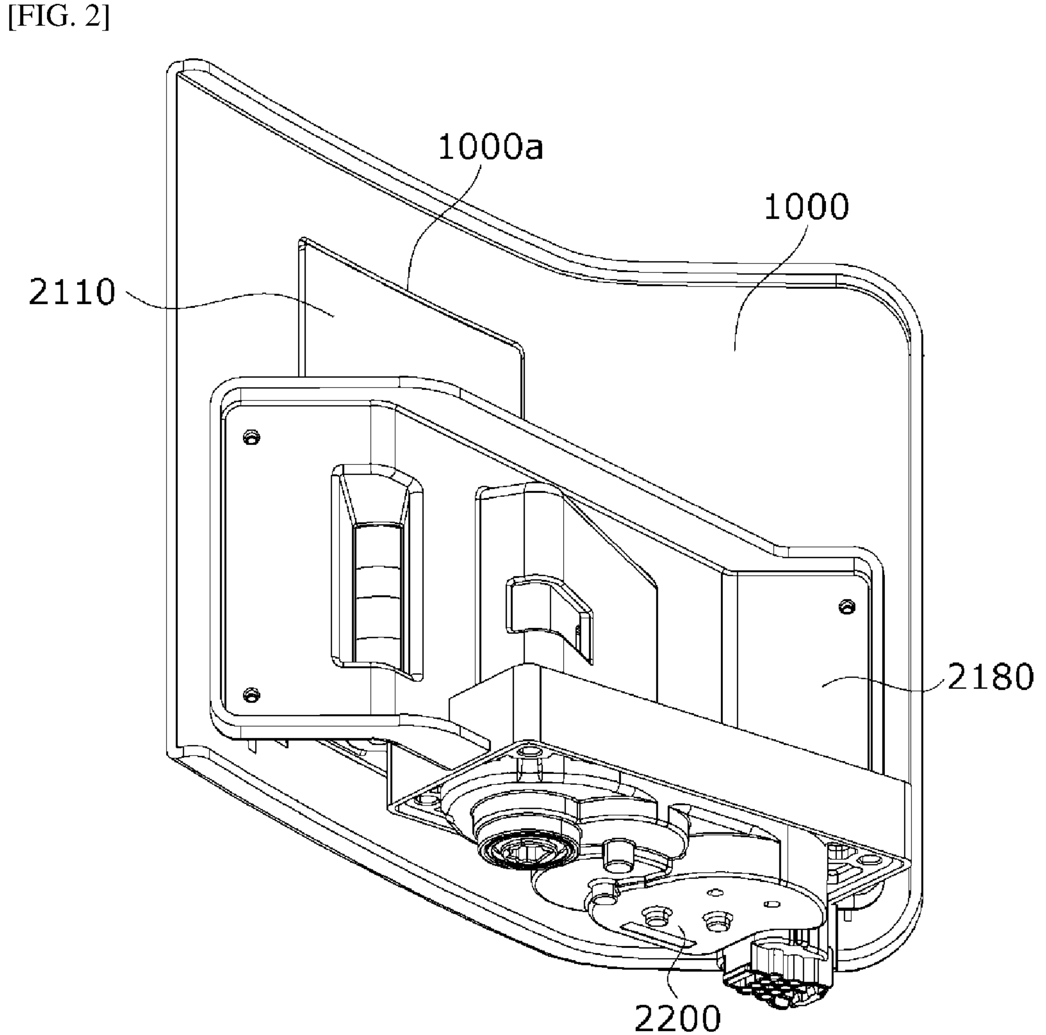

[FIG. 6]
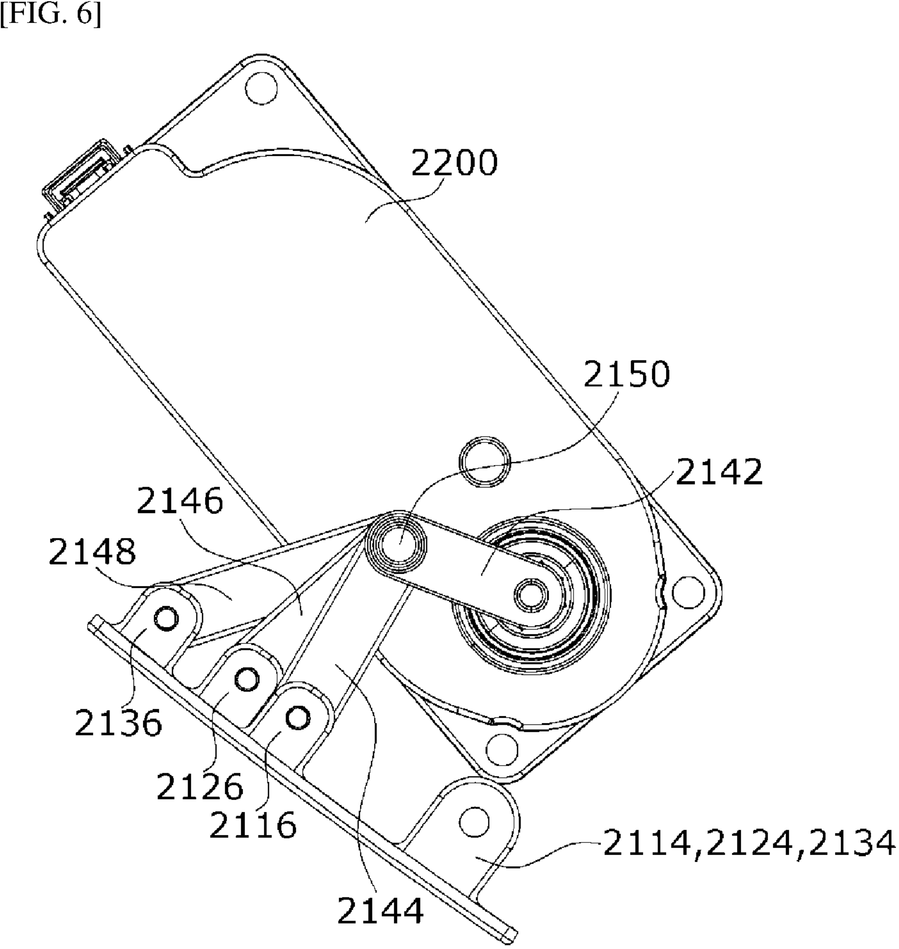

[FIG. 7]
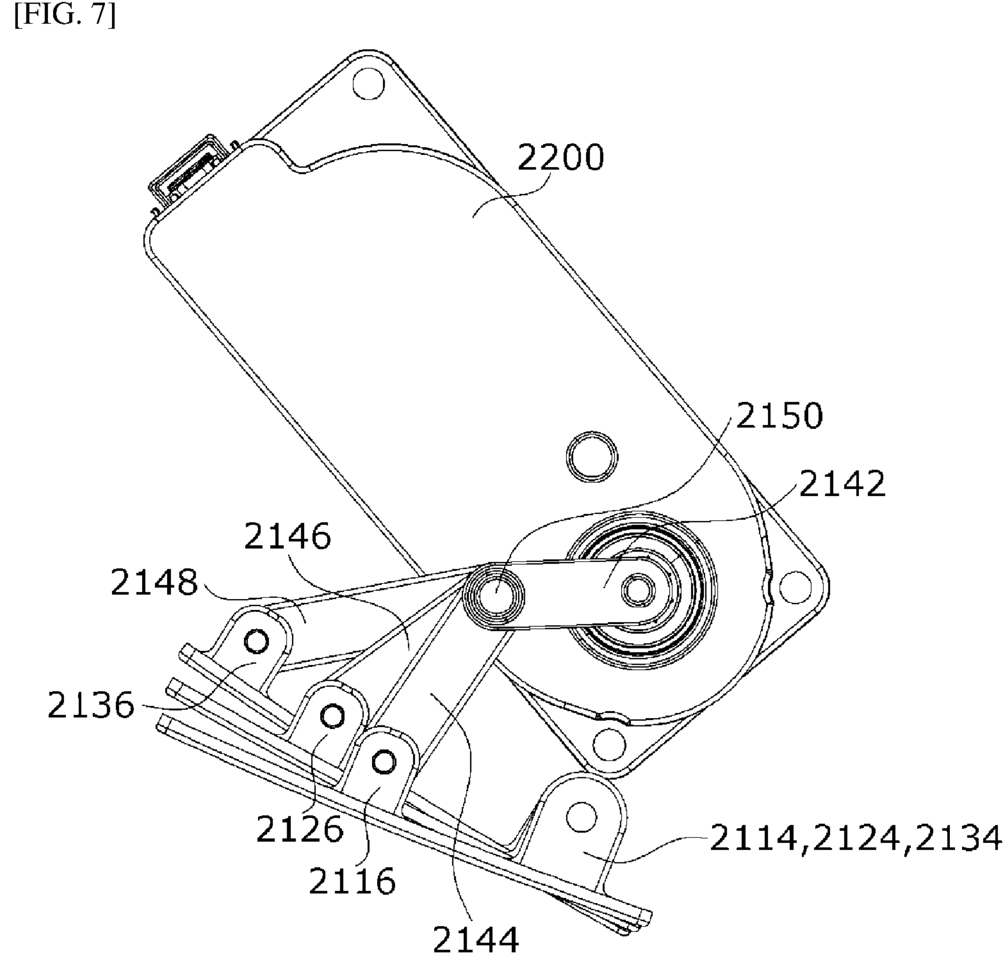

[FIG. 8]
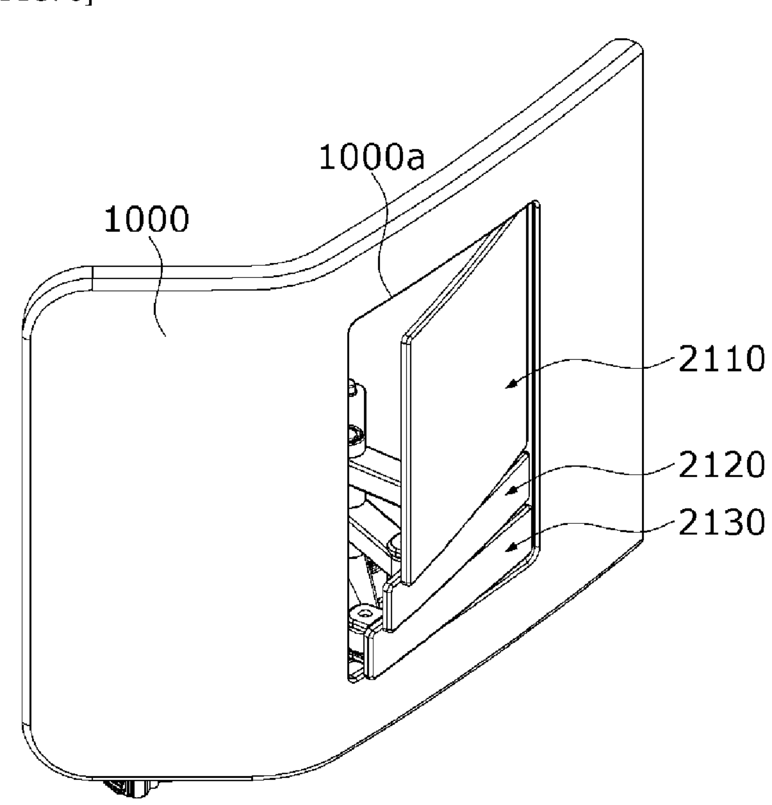

AIR CURTAIN APPARATUS AND VEHICLE BUMPER ASSEMBLY INCLUDING THE SAME

CROSS-REFERENCE TO RELATED APPLICATION

This application claims priority to and the benefit of Korean Patent Application No. 10-2023-0128090, filed on Sep. 25, 2023, the disclosure of which is incorporated herein by reference in its entirety.

BACKGROUND

1. Field of the Invention

The present invention relates to an air curtain apparatus and a vehicle bumper assembly including the same.

2. Discussion of Related Art

An air curtain apparatus is an apparatus that can improve aerodynamics of a vehicle. The air curtain apparatus may be disposed in a bumper disposed in the front of a vehicle and may guide headwind, which is generated when the vehicle travels, toward wheels.

Such an air curtain apparatus may include a flap for covering an inlet hole formed in a bumper, an actuator for generating power to rotate the flap, and a link for connecting the flap and the actuator and pushing or pulling the flap using power generated by the actuator.

The conventional air curtain maintains a state in which an inlet hole is opened by a flap so that air may flow to the inside of the bumper at any time. However, aerodynamics are more improved when the inlet hole is opened or closed according to a situation than when the inlet hole is open all the time.

In addition, there is a large change in shape exposed to the outside between a state in which the flap is rotated to open the inlet hole all the time and a state in which the inlet hole is closed by the flap, and this can be a factor in degrading aesthetics of the vehicle.

SUMMARY OF THE INVENTION

The present invention is directed to providing an air curtain apparatus capable of improving aerodynamics of a vehicle and preventing the degradation of aesthetics of the vehicle, and a vehicle bumper assembly including the same.

According to an aspect of the present invention, there is an air curtain apparatus disposed in a bumper cover provided with an inlet hole through which headwind is introduced, and the air curtain apparatus includes a flap assembly disposed in the inlet hole to open and close the inlet hole and an actuator coupled to the flap assembly to operate the flap assembly, wherein the flap assembly includes a plurality of flaps disposed collinear with the bumper cover to close the inlet hole and rotated in a stepped manner to open the inlet hole.

The plurality of flaps may include a first flap, a second flap, and a third flap which are disposed in the inlet hole in a height direction, and the first flap, the second flap, and the third flap may have the same rotational center.

The first flap may include a first axial protrusion and a first connecting protrusion disposed to be spaced apart from the first axial protrusion, the second flap may include a second axial protrusion and a second connecting protrusion disposed to be spaced apart from the second axial protrusion, the third flap may include a third axial protrusion and a third connecting protrusion disposed to be spaced apart from the third axial protrusion, and when viewed in the height direction, the first axial protrusion, the second axial protrusion, and the third axial protrusion may be disposed straightly collinear with each other.

A first distance from the first axial protrusion to the first connecting protrusion may be smaller than a second distance from the second axial protrusion to the second connecting protrusion, and the second distance may be smaller than a third distance from the third axial protrusion to the third connecting protrusion.

The flap assembly may include a link unit which transmits power generated by the actuator to the plurality of flaps.

The link unit may include a center link connected to the actuator and rotated by the power generated by the actuator, and the center link may include a first link groove, a second link groove, and a third link groove which are disposed in plurality in the height direction.

The link unit may include a first connecting link which is connected to the first link groove and the first connecting protrusion of the first flap and pushes or pulls the first flap in conjunction with rotation of the center link, a second connecting link which is connected to the second link groove and the second connecting protrusion of the second flap and pushes or pulls the second flap in conjunction with the rotation of the center link, and a third connecting link which is connected to the third link groove and the third connecting protrusion of the third flap and pushes or pulls the third flap in conjunction with the rotation of the center link.

The air curtain apparatus may include a cover housing which is disposed inside the bumper cover and rotatably supports the first axial protrusion, the second axial protrusion, and the third axial protrusion.

According to an aspect of the present invention, there is a vehicle bumper assembly including a bumper cover provided with an inlet hole through which headwind is introduced and an air curtain apparatus disposed in the bumper cover, wherein the air curtain apparatus includes a flap assembly disposed in the inlet hole to open and close the inlet hole and an actuator coupled to the flap assembly to operate the flap assembly, and the flap assembly includes a plurality of flaps disposed collinear with the bumper cover to close the inlet hole and rotated in a stepped manner to open the inlet hole.

The plurality of flaps may include a first flap, a second flap, and a third flap which are disposed in the inlet hole in a height direction, and the first flap, the second flap, and the third flap may have the same rotational center.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a front perspective view of a vehicle bumper assembly according to one embodiment of the present invention;

FIG. 2 is a rear perspective view of the vehicle bumper assembly according to one embodiment of the present invention;

FIG. 3 is an exploded perspective view of the vehicle bumper assembly according to one embodiment of the present invention;

FIG. 4 is a view illustrating a state in which a first flap, a second flap, and a third flap are coupled to a housing;

FIG. 5 is a rear view of the first flap, the second flap, and the third flap;

FIG. 6 is a view illustrating the first flap, the second flap, and the third flap connected to a center link through a first connecting link, a second connecting link, and a third connecting link;

FIG. 7 is a plan view illustrating the rotated first flap, second flap, and third flap; and FIG. 8 is a front perspective view illustrating the rotated first flap, second flap, and third flap.

DETAILED DESCRIPTION OF EXEMPLARY EMBODIMENTS

Since the present invention may be modified in various ways and have many embodiments, specific embodiments will be illustrated in and described with the accompanying drawings. However, this is not intended to limit the present invention to the specific embodiments, and it is to be appreciated that all changes, equivalents, and substitutes falling within the spirit and technical scope of the present invention are encompassed in the present invention.

While terms such as "first" and "second" may be used to describe various components, such components are not limited by the terms. These terms are used only to distinguish one component from another. For example, a first component could be called a second component, and, similarly, a second component could be called a first component without departing from the scope of the present invention. The term "and/or" includes any one or combination of the associated listed items.

When a first element is referred to as being "connected" or "coupled" to a second element, it will be understood that the first element may be directly connected or coupled to the second element, or a third element may be present therebetween. In contrast, when an element is referred to as being "directly connected" or "directly coupled" to another element, it will be understood that there are no intervening elements.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under the other element, such a description may include a case in which the one element is formed at an upper side or a lower side with respect to the other element.

The terminology used herein is for the purpose of describing particular embodiments only and is not intended to limit the present invention. The singular forms are intended to include the plural forms, unless the context clearly indicates otherwise. In the present specification, it should be further understood that the terms "comprise," "comprising," "include," and/or "including" used herein specify the presence of stated features, numbers, steps, operations, elements, and/or components but do not preclude the presence or addition of one or more other features, numbers, steps, operations, elements, components, and/or groups thereof.

Unless otherwise defined, all terms including technical and scientific terms used herein have meanings which are the same as meanings generally understood by those skilled in the art. Terms, such as those defined in commonly used dictionaries, should be interpreted as having meanings that are consistent with their meanings in the context of the relevant art and will not be interpreted in an idealized or overly formal sense unless expressly so defined here.

Hereinafter, when an air curtain apparatus and a vehicle bumper assembly including the same are described in detail with reference to the accompanying drawings, components that are the same or correspond to each other will be denoted by the same or corresponding reference numerals in all drawings, and redundant descriptions will be omitted.

Figure 3:
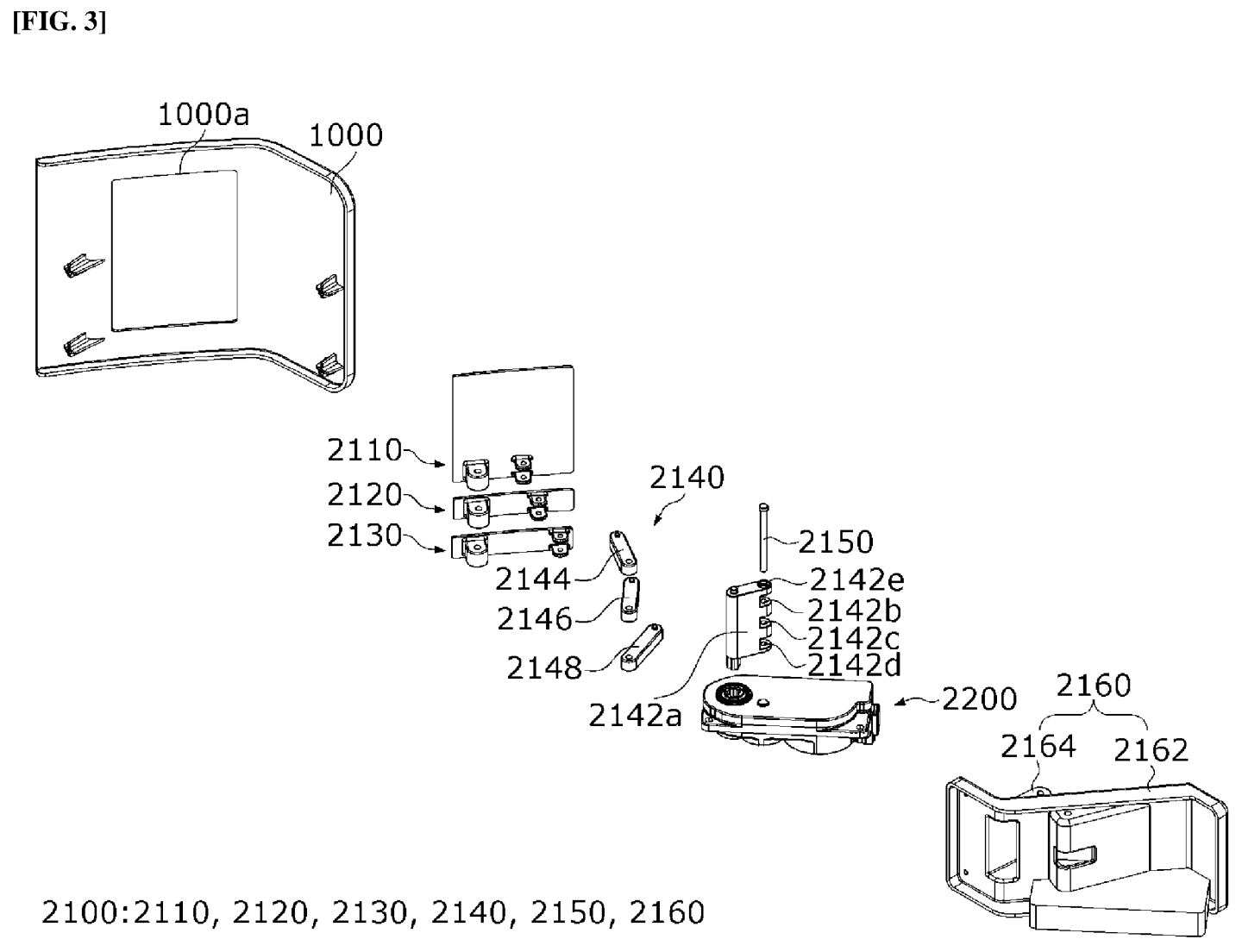
Figure 4:
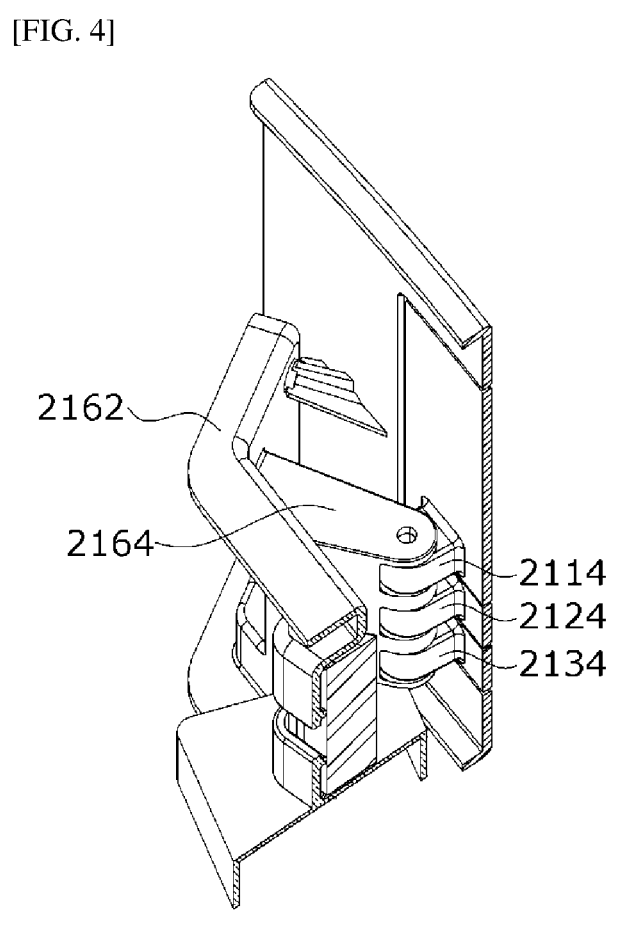
Figure 5:
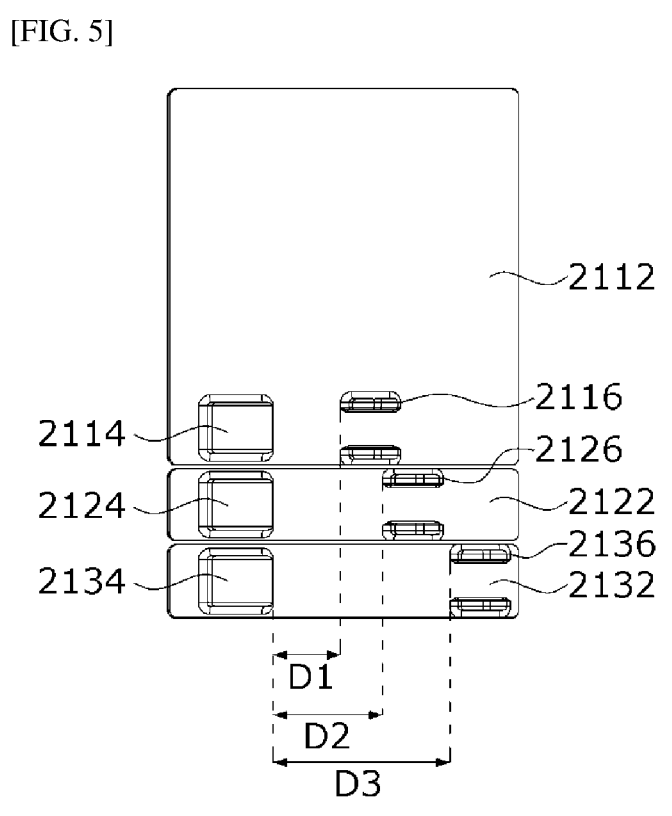

FIG. 1 is a front perspective view of a vehicle bumper assembly according to one embodiment of the present invention, and FIG. 2 is a rear perspective view of the vehicle bumper assembly according to one embodiment of the present invention. FIG. 3 is an exploded perspective view of the vehicle bumper assembly according to one embodiment of the present invention, and FIG. 4 is a view illustrating a state in which a first flap, a second flap, and a third flap are coupled to a housing. FIG. 5 is a rear view of the first flap, the second flap, and the third flap, and FIG. 6 is a view illustrating the first flap, the second flap, and the third flap connected to a center link through a first connecting link, a second connecting link, and a third connecting link. FIG. 7 is a plan view illustrating the rotated first flap, second flap, and third flap, and FIG. 8 is a front perspective view illustrating the rotated first flap, second flap, and third flap.

Referring to FIGS. 1 to 8, a vehicle bumper assembly according to one embodiment of the present invention includes a bumper cover 1000, in which an inlet hole **1000*a* through which headwind is introduced is formed, and an air curtain apparatus 2000 disposed on the bumper cover 1000**.

The bumper cover 1000 may be disposed on the front of a vehicle in a longitudinal direction to protect components in an engine room and have a "⊂" shape having rounded corners, but is not limited thereto. In this case, the longitudinal direction may be a direction from a passenger room (not shown) toward the engine room (not shown) of the vehicle or a reverse direction.

The bumper cover 1000 may include the inlet hole **1000*a*. The inlet hole 1000*a* may be disposed on each of both sides of the bumper cover 1000 in a width direction. In this case, the width direction may be a direction intersecting the longitudinal direction. The inlet hole 1000*a* is a hole through which the headwind passes when the vehicle travels, and the headwind which flows toward a wheel through the inlet hole 1000*a* may improve aerodynamics. In the present embodiment, only a portion of the bumper cover 1000 in which the inlet hole 1000*a*** is formed will be illustrated.

The air curtain apparatus 2000 includes a flap assembly 2100 disposed in the inlet hole **1000*a* to open or close the inlet hole 1000*a* and an actuator 2200 coupled to the flap assembly 2100 to operate the flap assembly 2100**.

The flap assembly 2100 may include a plurality of flaps, a link unit 2140, a pin 2150, and a cover housing 2160.

The plurality of flaps may be disposed collinear with the bumper cover 1000 to close the inlet hole **1000*a* and rotated in a stepped manner to open the inlet hole 1000*a*. In addition, the plurality of flaps may be serially disposed in the inlet hole 1000*a* so that opening sizes of the inlet hole 1000*a* are different. The plurality of flaps may include a first flap 2110, a second flap 2120, and a third flap 2130. The first flap 2110, the second flap 2120, and the third flap 2130 may be disposed in the inlet hole 1000***a* in a height direction. In this case, the height direction may be a direction perpendicularly intersecting the longitudinal direction and the width direction.

The first flap 2110 may be disposed in an upper end of the inlet hole 1000*a*. The first flap 2110 may be a main flap which maximally interferes with headwind. The first flap 2110 may include a first flap body 2112, a first axial protrusion 2114, and a first connecting protrusion 2116.

The first flap body 2112 may form an exterior of the first flap 2110. The first flap body 2112 may have a coverage area which is the largest in the inlet hole 1000*a* among the plurality of flaps, but is not limited thereto.

The first axial protrusion 2114 may be disposed on an inner surface of the first flap body 2112. In this case, the inner surface may be a non-exposed surface which is not exposed to the outside of the vehicle. The first axial protrusion 2114 may be disposed on one side of the first flap body 2112 in the width direction. A hole for accommodating the pin 2150 may be formed in the first axial protrusion 2114, and the pin 2150 may be accommodated in the hole so that the first axial protrusion 2114 is coupled to a housing. The hole formed in the first axial protrusion 2114 may be a rotational center of the first flap 2110.

The first connecting protrusion 2116 may be disposed on the inner surface of the first flap body 2112. A plurality of first connecting protrusions 2116 may be disposed on the inner surface of the first flap body 2112 in the height direction. The first connecting protrusions 2116 may be disposed on the other side opposite to the one side of the first flap body 2112 in the width direction. The first connecting protrusions 2116 may be disposed to be spaced apart from the first axial protrusion 2114 in the width direction. The first connecting protrusion 2116 may be connected to a first connecting link 2144 that will be described below.

The second flap 2120 may be disposed in a lower end of the inlet hole 1000*a* in the height direction. In addition, the second flap 2120 may be disposed under the first flap 2110 in the height direction. The second flap 2120 may be a sub flap. The second flap 2120 may include a second flap body 2122, a second axial protrusion 2124, and a second connecting protrusion 2126.

The second flap body 2122 may form an exterior of the second flap 2120. The second flap body 2122 may have a rectangular shape in which a length in the width direction is greater than a length in the height direction.

The second axial protrusion 2124 may be disposed on an inner surface of the second flap body 2122. The second axial protrusion 2124 may be disposed on one side of the second flap body 2122 in the width direction. A hole for accommodating the pin 2150 may be formed in the second axial protrusion 2124, and the pin 2150 may be accommodated in the hole so that the second axial protrusion 2124 is coupled to the housing. The hole formed in the second axial protrusion 2124 may be a rotational center of the second flap 2120.

The second connecting protrusion 2126 may be disposed on the inner surface of the second flap body 2122. A plurality of second connecting protrusions 2126 may be disposed on the inner surface of the second flap body 2122 in the height direction. The second connecting protrusions 2126 may be disposed on the other side opposite to the one side of the second flap body 2122 in the width direction. The second connecting protrusions 2126 may be disposed to be spaced apart from the second axial protrusion 2124 in the width direction. The second connecting protrusions 2126 may be connected to a second connecting link 2146 that will be described below.

The third flap 2130 may be disposed in the lower end of the inlet hole 1000*a* in the height direction. In addition, the third flap 2130 may be disposed under the second flap 2120 in the height direction. The third flap 2130 may be a sub flap. The third flap 2130 may include a third flap body 2132, a third axial protrusion 2134, and a third connecting protrusion 2136.

The third flap body 2132 may form an exterior of the third flap 2130. The third flap body 2132 may have a rectangular shape in which a length in the width direction is greater than a length in the height direction.

The third axial protrusion 2134 may be disposed on an inner surface of the third flap body 2132. The third axial protrusion 2134 may be disposed on one side of the third flap body 2132 in the width direction. A hole for accommodating the pin 2150 may be formed in the third axial protrusion 2134, and the pin 2150 may be accommodated in the hole so that the third axial protrusion 2134 is coupled to the housing. The hole formed in the third axial protrusion 2134 may be a rotational center of the third flap 2130.

The third connecting protrusion 2136 may be disposed on the inner surface of the third flap body 2132. A plurality of third connecting protrusions 2136 may be disposed on the inner surface of the third flap body 2132 in the height direction. The third connecting protrusions 2136 may be disposed on the other side opposite to the one side of the third flap body 2132 in the width direction. The third connecting protrusions 2136 may be disposed to be spaced apart from the third axial protrusion 2134 in the width direction. The third connecting protrusion 2136 may be connected to a third connecting link 2148 that will be described below.

As illustrated in FIG. 6, the first axial protrusion 2114, the second axial protrusion 2124, and the third axial protrusion 2134 may be disposed straightly collinear with each other. More specifically, the first axial protrusion 2114, the second axial protrusion 2124, and the third axial protrusion 2134 may be coupled using the pin 2150 to be disposed straightly collinear with each other. Accordingly, since the coupling using the pin 2150 may be easy, a need for forcibly coupling the pin 2150 to connect the flaps is reduced, and thus manufacturing time and rotation failure issues of each flap can be reduced.

In addition, since the first axial protrusion 2114, the second axial protrusion 2124, and the third axial protrusion 2134 are disposed collinear with each other, the first flap 2110, the second flap 2120, and the third flap 2130 have the same rotational center. Accordingly, since the first axial protrusion 2114, the second axial protrusion 2124, and the third axial protrusion 2134 are rotated simultaneously by rotation of the pin 2150, it may mean that power by the actuator 2200 for each flap is not needed. Accordingly, since three flaps are operated by one actuator 2200, costs for providing additional actuators 2200 can be reduced.

The link unit 2140 may transmit power generated by the actuator 2200 to the plurality of flaps. The link unit 2140 may include a center link 2142, a first connecting link 2144, a second connecting link 2146, and a third connecting link 2148.

The center link 2142 may be connected to the actuator 2200 and rotated by the power generated by the actuator 2200. The center link 2142 may include a first link body 2142*a*, a first link groove 2142*b*, a second link groove 2142*c*, and a third link groove 2142*d*.

The first link body 2142*a* may form an exterior of the center link 2142. The first link body 2142*a* may have a rectangular hexahedron shape in which both ends in the width direction are rounded. The first link body 2142*a* may have a height greater than the sum of heights of the first connecting link 2144, the second connecting link 2146, and the third connecting link 2148 in the height direction.

The first link groove 2142*b*, the second link groove 2142*c*, and the third link groove 2142*d* may be disposed in plurality in the first link body 2142*a* in the height direction. In addition, in the height direction, the first link groove 2142*b* may be disposed above the second link groove 2142*c*, and the second link groove 2142*c* may be disposed above the third link groove 2142*d*. In addition, the first link groove 2142*b*, the second link groove 2142*c*, and the third link groove 2142*d* may be disposed to be spaced apart from each other in the height direction. The first link groove 2142*b* may accommodate one end of the first connecting link 2144, the second link groove 2142*c* may accommodate one end of the second connecting link 2146, and the third link groove 2142*d* may accommodate one end of the third connecting link 2148.

Meanwhile, connecting holes 2142*e* may be formed in the first link body 2142*a*. The connecting holes 2142*e* may be disposed at positions at which the connecting holes 2142*e* pass through the link grooves in the height direction of the center link 2142. The connecting holes 2142*e* may accommodate the pin 2150, and the pin 2150 passing through the connecting holes 2142*e* may be supported by the first link body 2142*a* of the center link 2142. The connecting holes 2142*e* may be rotational centers of the first connecting link 2144, the second connecting link 2146, and the third connecting link 2148.

The first connecting link 2144 may have a rectangular hexahedron shape having rounded corners. The first connecting link 2144 may be connected to the first link groove 2142*b* of the center link 2142 and the first connecting protrusion 2116 of the first flap 2110. Accordingly, the first connecting link 2144 may connect the first flap 2110 and the center link 2142. The first connecting link 2144 may push or pull the first flap 2110 in conjunction with rotation of the center link 2142. More specifically, when the center link 2142 is rotated by power generated by the actuator 2200, the first connecting link 2144 may transmit a pushing or pulling force to the first flap body 2112 of the first flap 2110 while rotating with the center link 2142.

The second connecting link 2146 may have a rectangular hexahedron shape having rounded corners. The second connecting link 2146 may be connected to the second link groove 2142*c* of the center link 2142 and the second connecting protrusion 2126 of the second flap 2120. Accordingly, the second connecting link 2146 may connect the second flap 2120 and the center link 2142. The second connecting link 2146 may push or pull the second flap 2120 in conjunction with the rotation of the center link 2142. More specifically, when the center link 2142 is rotated by the power generated by the actuator 2200, the second connecting link 2146 may transmit a pushing or pulling force to the second flap body 2122 of the second flap 2120 while rotating with the center link 2142.

The third connecting link 2148 may have a rectangular hexahedron shape having rounded corners. The third connecting link 2148 may be connected to the third link groove 2142*d* of the center link 2142 and the third connecting protrusion 2136 of the second flap 2120. Accordingly, the third connecting link 2148 may connect the third flap 2130 and the center link 2142. The third connecting link 2148 may push or pull the third flap 2130 in conjunction with the rotation of the center link 2142. More specifically, when the center link 2142 is rotated by the power generated by the actuator 2200, the third connecting link 2148 may transmit a pushing or pulling force to the third flap body 2132 of the third flap 2130 while rotating with the center link 2142.

As illustrated in FIGS. 5 and 6, a first distance D1 from the first axial protrusion 2114 to the first connecting protrusion 2116 may be smaller than a second distance D2 from the second axial protrusion 2124 to the second connecting protrusion 2126, and the second distance D2 may be smaller than a third distance D3 from the third axial protrusion 2134 to the third connecting protrusion 2136. Accordingly, the first connecting protrusion 2116 of the first flap 2110 may be disposed closer to the center link 2142 than the other connecting protrusions.

Accordingly, an angle formed between the center link 2142 and the first connecting link 2144 may be smaller than an angle formed between the center link 2142 and the second connecting link 2146 and an angle formed between the center link 2142 and the third connecting link 2148. Accordingly, since a rotation distance of the first connecting link 2144 to reach a position at which the first connecting link 2144 operates in conjunction with the center link 2142 so that the first connecting link 2144 is straightly colinear with the center link 2142 is the greatest, the first flap 2110 may be rotated more than the second flap 2120 and the third flap 2130. Accordingly, the first flap 2110, which is the main flap, may maximally open the inlet hole 1000*a* of the bumper cover 1000 so that a largest amount of headwind flows into the inside of the bumper cover 1000.

In addition, the first flap 2110 may be rotated more than the second flap 2120, and the second flap 2120 may be rotated more than the third flap 2130. That is, when viewed in the height direction, a shape in which the plurality of flaps are rotated in a stepped manner with respect to each other may be implemented. Accordingly, when the air curtain apparatus 2000 operates, a design visibility of the vehicle can be maintained without being damaged.

The pin 2150 may be a combination of a head having a rounded cross section and a body coupled to the head. A plurality of pins 2150 may be provided. One of the plurality of pins 2150 may pass through the connecting hole 2142*e* of the center link 2142 to connect the center link 2142, the first flap 2110, the second flap 2120, and the third flap 2130, and the other of the plurality of pins 2150 may connect the cover housing 2160, the first flap 2110, the second flap 2120, and the third flap 2130.

The cover housing 2160 may be disposed inside the bumper cover 1000. The cover housing 2160 may rotatably support the first axial protrusion 2114 of the first flap 2110, the second axial protrusion 2124 of the second flap 2120, and the third axial protrusion 2134 of the third flap 2130. The cover housing 2160 may include a housing body 2162 and a support protrusion 2164.

The housing body 2162 may form an exterior of the cover housing 2160. The housing body 2162 may be fixed to the bumper cover 1000 using a coupling member such as a bolt. The housing body 2162 and the bumper cover 1000 may form a space for accommodating the plurality of flaps and the link units 2140.

The support protrusion 2164 may protrude from the housing body 2162. The support protrusion 2164 may be coupled to the first axial protrusion 2114 of the first flap 2110, the second axial protrusion 2124 of the second flap 2120, and the third axial protrusion 2134 of the third flap 2130 to rotatably support the first axial protrusion 2114, the second axial protrusion 2124, and the third axial protrusion 2134.

The actuator 2200 may be connected to the center link 2142. The actuator 2200 may be connected to an external power supply apparatus and may generate power using power transmitted to a power supply device. The center link 2142 may be rotated by the power generated by the actuator 2200. In the present embodiment, an example in which the actuator 2200 is disposed above the center link, but the present invention is not limited thereto.

As described above, in the vehicle bumper assembly according to one embodiment of the present invention, since the air curtain apparatus 2000 can control an inflow amount of headwind and also satisfy a user's design visibility, consumer satisfaction can be improved.

According to one embodiment of the present invention, since an inlet hole can be opened by a plurality of flaps in a stepped manner, the aerodynamics of a vehicle can be improved, and the design visibility of the vehicle can be satisfied.

While the present invention has been described above with reference to exemplary embodiments, it may be understood by those skilled in the art that various modifications and changes of the present invention may be made within a range not departing from the spirit and scope of the present invention defined by the appended claims. In addition, it should be interpreted that differences related to the modifications and changes fall within the scope of the present invention defined by the appended claims.

What is claimed is:

1. An air curtain apparatus disposed in a bumper cover provided with an inlet hole through which headwind is introduced, the air curtain apparatus comprising:

a flap assembly disposed in the inlet hole to open and close the inlet hole; and an actuator coupled to the flap assembly to operate the flap assembly, wherein the flap assembly includes a plurality of flaps disposed collinear with the bumper cover to close the inlet hole and rotated in a stepped manner to open the inlet hole, wherein the plurality of flaps include a first flap, a second flap, and a third flap which are disposed in the inlet hole in a height direction of the bumper cover; and the first flap, the second flap, and the third flap have the same rotational center.

2. The air curtain apparatus of claim 1, wherein:

the first flap includes a first axial protrusion and a first connecting protrusion disposed to be spaced apart from the first axial protrusion;

the second flap includes a second axial protrusion and a second connecting protrusion disposed to be spaced apart from the second axial protrusion;

the third flap includes a third axial protrusion and a third connecting protrusion disposed to be spaced apart from the third axial protrusion; and the first axial protrusion, the second axial protrusion, and the third axial protrusion are disposed straightly collinear with each other in the height direction of the bumper cover.

3. The air curtain apparatus of claim 2, wherein:

a first distance from the first axial protrusion to the first connecting protrusion is smaller than a second distance from the second axial protrusion to the second connecting protrusion; and the second distance is smaller than a third distance from the third axial protrusion to the third connecting protrusion.

4. The air curtain apparatus of claim 2, wherein the flap assembly includes a link unit which transmits power generated by the actuator to the plurality of flaps.

5. The air curtain apparatus of claim 4, wherein:

the link unit includes a center link connected to the actuator and rotated by the power generated by the actuator; and the center link includes a first link groove, a second link groove, and a third link groove which are disposed in plurality in the height direction.

6. The air curtain apparatus of claim 5, wherein the link unit includes:

a first connecting link which is connected to the first link groove and the first connecting protrusion of the first flap, and the first connecting link pushes or pulls the first flap in conjunction with rotation of the center link;

a second connecting link is connected to the second link groove and the second connecting protrusion of the second flap, the second connecting link pushes or pulls the second flap in conjunction with the rotation of the center link; and a third connecting link is connected to the third link groove and the third connecting protrusion of the third flap, the third connecting link pushes or pulls the third flap in conjunction with the rotation of the center link.

7. The air curtain apparatus of claim 2, comprising a cover housing which is disposed inside the bumper cover and rotatably supports the first axial protrusion, the second axial protrusion, and the third axial protrusion.

8. A vehicle bumper assembly comprising:

a bumper cover provided with an inlet hole through which headwind is introduced; and an air curtain apparatus disposed in the bumper cover, wherein the air curtain apparatus includes a flap assembly disposed in the inlet hole to open and close the inlet hole and an actuator coupled to the flap assembly to operate the flap assembly, and the flap assembly includes a plurality of flaps disposed collinear with the bumper cover to close the inlet hole and rotated in a stepped manner to open the inlet hole, wherein the plurality of flaps include a first flap, a second flap, and a third flap which are disposed in the inlet hole in a height direction of the bumper cover; and the first flap, the second flap, and the third flap have the same rotational center.

9. The vehicle bumper assembly of claim 8, wherein:

the first flap includes a first axial protrusion and a first connecting protrusion disposed to be spaced apart from the first axial protrusion;

the second flap includes a second axial protrusion and a second connecting protrusion disposed to be spaced apart from the second axial protrusion;

the third flap includes a third axial protrusion and a third connecting protrusion disposed to be spaced apart from the third axial protrusion; and the first axial protrusion, the second axial protrusion, and the third axial protrusion are disposed straightly collinear with each other in the height direction of the bumper cover.

10. The vehicle bumper assembly of claim 9, wherein:

a first distance from the first axial protrusion to the first connecting protrusion is smaller than a second distance from the second axial protrusion to the second connecting protrusion; and the second distance is smaller than a third distance from the third axial protrusion to the third connecting protrusion.

11. The vehicle bumper assembly of claim 9, wherein the flap assembly includes a link unit which transmits power generated by the actuator to the plurality of flaps.

12. The vehicle bumper assembly of claim 11, wherein:

the link unit includes a center link connected to the actuator and rotated by the power generated by the actuator; and the center link includes a first link groove, a second link groove, and a third link groove which are disposed in plurality in the height direction.

13. The vehicle bumper assembly of claim 12, wherein the link unit includes:

a first connecting link which is connected to the first link groove and the first connecting protrusion of the first flap, and the first connecting link pushes or pulls the first flap in conjunction with rotation of the center link;

a second connecting link is connected to the second link groove and the second connecting protrusion of the second flap, the second connecting link pushes or pulls the second flap in conjunction with the rotation of the center link; and a third connecting link is connected to the third link groove and the third connecting protrusion of the third flap, the third connecting link pushes or pulls the third flap in conjunction with the rotation of the center link.

14. The vehicle bumper assembly of claim 9, wherein the air curtain apparatus comprises: a cover housing which is disposed inside the bumper cover and rotatably supports the first axial protrusion, the second axial protrusion, and the third axial protrusion.

* * * * *